United States Patent
Weisenstein et al.

(10) Patent No.: US 11,367,914 B2
(45) Date of Patent: Jun. 21, 2022

(54) POUCHED METAL-AIR BATTERY CELLS

(71) Applicant: ZAF ENERGY SYSTEMS, INCORPORATED, Bozeman, MT (US)

(72) Inventors: Adam Weisenstein, Bozeman, MT (US); William A. Garcia, Bozeman, MT (US); Joel Ballard, Columbia Falls, MT (US); Sean Barrett, Bigfork, MT (US); Melissa D. McIntyre, Butte, MT (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 17/520,304

(22) Filed: Nov. 5, 2021

(65) Prior Publication Data
US 2022/0149465 A1    May 12, 2022

Related U.S. Application Data

(60) Provisional application No. 63/110,629, filed on Nov. 6, 2020.

(51) Int. Cl.
| | |
|---|---|
| *H01M 12/08* | (2006.01) |
| *H01M 50/105* | (2021.01) |
| *H01M 50/126* | (2021.01) |
| *H01M 50/124* | (2021.01) |
| *H01M 50/131* | (2021.01) |
| *H01M 4/134* | (2010.01) |
| *H01M 4/02* | (2006.01) |

(52) U.S. Cl.
CPC ......... *H01M 50/131* (2021.01); *H01M 12/08* (2013.01); *H01M 50/105* (2021.01); *H01M 50/126* (2021.01); *H01M 4/134* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2,422,045 A | 6/1947 | Ruben | |
| 2,593,893 A | 4/1952 | King | |
| 3,201,281 A | 8/1965 | Solomon | |
| 3,230,115 A | 1/1966 | Tamminen | |

(Continued)

FOREIGN PATENT DOCUMENTS

| | | |
|---|---|---|
| CN | 101969144 A | 2/2011 |
| DE | 4014945 A1 | 11/1991 |

(Continued)

OTHER PUBLICATIONS

International Search Report and Written Opinion of the International Searching Authority for International Application No. PCT/US2021/058393, dated Feb. 10, 2022, 8 pgs.

*Primary Examiner* — Yoshitoshi Takeuchi
(74) *Attorney, Agent, or Firm* — Brooks Kushman P.C.

(57) ABSTRACT

A metal air battery cell has a sealed pouch defined by a metallocene film and a gas and liquid impermeable flexible layer, and an electrochemical cell contained within the pouch. The metallocene film and gas and liquid impermeable flexible layer are sealed to each other and around the electrochemical cell.

6 Claims, 3 Drawing Sheets

(56) References Cited

U.S. PATENT DOCUMENTS

| | | | |
|---|---|---|---|
| 3,513,031 A | 5/1970 | Zaromb | |
| 3,785,868 A | 1/1974 | Devitt | |
| 4,060,670 A | 11/1977 | Tamminen | |
| 4,225,657 A | 9/1980 | Klein et al. | |
| 4,298,666 A | 11/1981 | Taskier | |
| 5,405,713 A | 4/1995 | Pecherer et al. | |
| 5,508,121 A | 4/1996 | Sawa | |
| 5,626,988 A | 5/1997 | Daniel-Ivad et al. | |
| 6,127,061 A | 10/2000 | Shun et al. | |
| 6,395,701 B1 | 5/2002 | Connor et al. | |
| 6,447,942 B1 | 9/2002 | Ovshinsky et al. | |
| 6,660,680 B1 | 12/2003 | Hampden-Smith et al. | |
| 6,753,108 B1 | 6/2004 | Hampden-Smith et al. | |
| 6,838,504 B1 | 1/2005 | Webster et al. | |
| 6,911,412 B2 | 6/2005 | Hampden-Smith et al. | |
| 6,991,754 B2 | 1/2006 | Hampden-Smith et al. | |
| 7,066,976 B2 | 6/2006 | Hampden-Smith et al. | |
| 7,087,341 B2 | 8/2006 | Hampden-Smith et al. | |
| 7,138,354 B2 | 11/2006 | Hampden-Smith et al. | |
| 7,141,528 B2 | 11/2006 | Hampden-Smith et al. | |
| 7,226,547 B2 | 6/2007 | Hampden-Smith et al. | |
| 7,341,674 B1 | 3/2008 | Trinh et al. | |
| 7,348,096 B2 | 3/2008 | Schubert et al. | |
| 7,632,605 B2 | 12/2009 | Guo et al. | |
| 7,722,687 B2 | 5/2010 | Hampden-Smith et al. | |
| 7,824,806 B2 | 11/2010 | Visco et al. | |
| 8,481,187 B2 | 7/2013 | Zhang et al. | |
| 8,580,704 B2 | 11/2013 | Lefevre et al. | |
| 9,133,337 B2 | 9/2015 | Ludvik et al. | |
| 9,431,660 B2 | 8/2016 | Christensen et al. | |
| 9,464,162 B2 | 10/2016 | Kron et al. | |
| 9,564,656 B1 | 2/2017 | Zhamu et al. | |
| 9,680,193 B2 | 6/2017 | Amendola et al. | |
| 9,734,954 B2 | 8/2017 | Lai et al. | |
| 9,819,055 B2 | 11/2017 | Zeine | |
| 9,905,856 B1 | 2/2018 | Zhamu et al. | |
| 9,957,163 B2 | 5/2018 | Fan et al. | |
| 10,026,995 B2 | 7/2018 | Zhamu et al. | |
| 10,158,121 B2 | 12/2018 | Zhamu et al. | |
| 10,211,450 B2 | 2/2019 | Vu et al. | |
| 10,604,854 B2 | 3/2020 | Dai et al. | |
| 2003/0180609 A1* | 9/2003 | Yamashita | H01M 50/543 |
| | | | 429/185 |
| 2009/0023077 A1 | 1/2009 | Kato et al. | |
| 2009/0317708 A1* | 12/2009 | Brandl | B32B 15/08 |
| | | | 429/163 |
| 2010/0112454 A1* | 5/2010 | Visco | H01M 4/668 |
| | | | 429/246 |
| 2011/0059364 A1 | 3/2011 | Zhang et al. | |
| 2012/0148892 A1* | 6/2012 | Hoecker | B32B 27/288 |
| | | | 429/99 |
| 2013/0084474 A1 | 4/2013 | Mills | |
| 2014/0072836 A1 | 3/2014 | Mills | |
| 2015/0118585 A1* | 4/2015 | Wilkins | G06F 1/1626 |
| | | | 429/407 |
| 2017/0027168 A1 | 2/2017 | Heath | |
| 2017/0152359 A1 | 6/2017 | Yen | |
| 2017/0166716 A1 | 6/2017 | Yen | |
| 2017/0184543 A1 | 6/2017 | Posner et al. | |
| 2017/0207484 A1 | 7/2017 | Zhamu et al. | |
| 2018/0047984 A1 | 2/2018 | Kang et al. | |
| 2019/0067732 A1 | 2/2019 | Zhamu et al. | |
| 2019/0221891 A1 | 7/2019 | Lockett et al. | |
| 2019/0273297 A1 | 9/2019 | Weisenstein et al. | |

FOREIGN PATENT DOCUMENTS

| | | |
|---|---|---|
| JP | 2005100742 A | 4/2005 |
| JP | 2016081705 A | 5/2016 |
| KR | 1020190081377 | 7/2019 |
| KR | 20200010873 A | 1/2020 |
| RU | 19965 U1 | 10/2001 |
| WO | 0044405 A1 | 8/2000 |

* cited by examiner

POUCHED METAL-AIR BATTERY CELLS

CROSS-REFERENCE TO RELATED APPLICATION

This application claims the benefit of provisional application No. 63/110,629, filed Nov. 6, 2020, the entire contents of which are incorporated by reference herein.

TECHNICAL FIELD

This disclosure relates to metal-air batteries and electrodes therein.

BACKGROUND

Electrochemical devices, such as batteries and fuel cells, typically incorporate an electrolyte source to provide the anions or cations necessary to produce an electrochemical reaction. Batteries and fuel cells operate on the electrochemical reaction of hydrogen-air, metal-air, metal-halide, metal-hydride, metal-intercalation compounds, or other materials capable of electrochemical reaction.

Metal-air batteries (or metal-oxygen batteries) with aqueous and non-aqueous electrolytes have attracted industry interest for many years as these reactors can have high energy densities and be relatively inexpensive to produce. Sizes can range from the small to power hearing aids or cameras to the large to power vehicles.

A unique property of metal-oxygen batteries compared to other batteries is that the cathode active material (i.e., oxygen) is typically not stored in the battery. When the battery is exposed to the environment, oxygen enters the cell through an oxygen diffusion membrane and porous air electrode and is reduced at the surface of a catalytic air electrode, forming peroxide ions and/or oxide ions in non-aqueous electrolytes or hydroxide anions in aqueous electrolytes. As an example, a mass of metal can form a porous anode that is saturated with an electrolyte. During discharge, oxygen reacts at a cathode to form hydroxyl ions that migrate into the metal-electrolyte to form a metal hydroxide, releasing electrons to travel to a cathode. The metal hydroxide decays into metal oxide and the resulting water returns to the electrolyte. The water and hydroxyls from the anode are recycled at the cathode, so the water is not consumed. The reverse process can also occur. During charge, electrons react with the metal oxide to reform the metal, releasing hydroxyl ions that migrate to the cathode. The hydroxyl ions are then oxidized to oxygen gas and water.

SUMMARY

A metal air battery cell has an electrode assembly including an air electrode, a negative electrode, a separator in contact with and disposed between the electrodes, and a sealed pouch that envelops the electrode assembly and contains an electrolyte therein. The pouch is defined by a gas permeable hydrophobic flexible layer in contact with the air electrode, and a gas and liquid impermeable flexible layer in contact with the negative electrode. The metal air battery cell further has a metallocene film in contact with and completely covering the gas permeable hydrophobic flexible layer such that the gas permeable hydrophobic flexible layer is between the metallocene film and air electrode.

A metal air battery cell has an electrode assembly including an air electrode and a gas permeable hydrophobic flexible layer in contact with the air electrode, a negative electrode, a separator in contact with and disposed between the electrodes, and a sealed pouch that envelops the electrode assembly and contains an electrolyte therein. The pouch is defined by a metallocene film that is in contact with the electrodes and completely covers the gas permeable hydrophobic flexible layer such that the gas permeable hydrophobic flexible layer is between the metallocene film and air electrode.

A metal air battery cell has an electrode assembly including two air electrodes and two gas permeable hydrophobic flexible layers, a negative electrode disposed between the air electrodes, at least one separator in contact with and disposed between the air electrodes and negative electrode, and a sealed pouch that envelops the electrode assembly and contains an electrolyte therein. The pouch is defined by a metallocene film in contact with the air electrodes such that the metallocene film is in contact with and completely covers the two gas permeable hydrophobic flexible layers, and each of the gas permeable hydrophobic flexible layers is between the metallocene film and one of the air electrodes.

A metal air battery cell has a sealed pouch defined by a metallocene film and a gas and liquid impermeable flexible layer, and an electrochemical cell contained within the pouch. The metallocene film and gas and liquid impermeable flexible layer are sealed to each other and around the electrochemical cell.

A metal air battery cell includes an electrochemical cell and a sealed pouch containing the electrochemical cell. The pouch is defined by a metallocene film that envelops the electrochemical cell.

DETAILED DESCRIPTION

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Containment of a metal-air battery usually requires complex ridged structures with pressure seals or adhesives to contain moisture, while also allowing the passage of air to the positive electrode. Here, metal-air pouch cells are described that can contain moisture and also allow the access of needed air by, for example, sealing a gas permeable and hydrophobic material to a gas and liquid impermeable material and/or a gas reduction material. The gas permeable and hydrophobic material may allow gas flow to the air electrode or electrodes while deterring the escape of moisture due to its hydrophobic nature. The gas reduction material may limit the gas flow. These materials can be heat sealed, at ends of the pouch, to a gas and liquid impermeable material. Such a pouch may be simple, light weight, thin, easily manufactured, and cost effective, while providing all of the necessary containment functions for a metal-air cell.

Figure 1:
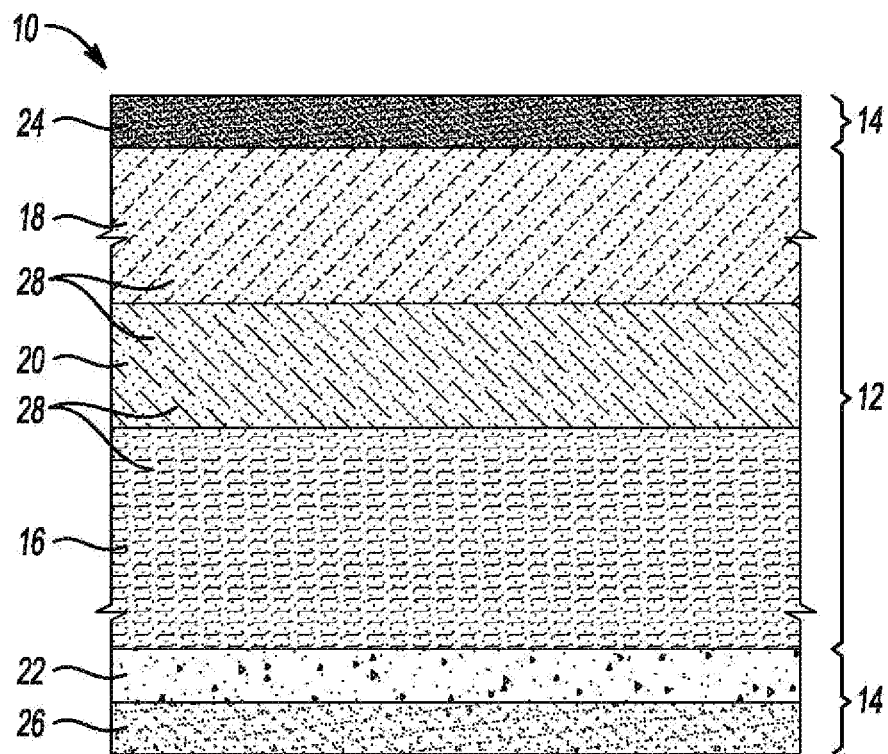
FIGS. 1 and 2 are side views, in cross-section, of metal-air pouch cells.

Referring to FIG. 1, a metal-air battery cell 10 (e.g., an electrochemically rechargeable battery cell, a primary battery cell, etc.) includes an electrode assembly 12 and a pouch 14. The electrode assembly 12 includes an air electrode (e.g., a bi-directional air electrode) 16, a negative electrode (e.g., zinc electrode) 18, and a separator (or membrane) 20 in contact with and between the air electrode 16 and negative electrode 18.

The pouch 14 includes a gas permeable hydrophobic flexible layer 22 in contact with the side of the air electrode 16 opposite the separator 20, and a gas and liquid impermeable flexible layer 24 in contact with the negative electrode 18 such that the gas permeable hydrophobic flexible layer 22 is not in contact with the negative electrode 18, and the gas and liquid impermeable flexible layer 24 is not in contact with the air electrode 16. The gas permeable hydrophobic flexible layer 22 can be non-sintered polytetrafluoroethylene. It can also be polymeric and chemically inert in the electrolyte environment. The pouch 14 further includes a gas reduction layer 26 in contact with the side of the gas permeable hydrophobic flexible layer 22 opposite the air electrode 16. In other examples, the gas reduction layer 26 is not part of the pouch 14, but instead heat sealed or otherwise bonded to it. The gas reduction layer 26 can be metallocene, have a thickness in the approximate range of 1 to 30 microns, and/or may have a Gurley air permeability of 10,000 to 50,000 seconds or more. Without the gas reduction layer 26, the pouch 14 may have a Gurley air permeability in the range of 100 to 500 Gurley seconds.

The gas permeable hydrophobic flexible layer 22 (or gas reduction layer 26) and the gas and liquid impermeable flexible layer 24 are sealed (e.g., heat sealed) to each other around a perimeter of the pouch 14. A thermoplastic hot melt or other adhesive can further define a seam for the pouch 14. As a result, the pouch 14 envelops the electrode assembly 12 and contains an electrolyte 28 within which the electrode assembly 12 is immersed, in contact with, or wetted. The electrolyte 28 may be acidic, alkaline, or neutral. And, it may be a gel, an ionic liquid, a liquid, or a solid.

Figure 2:
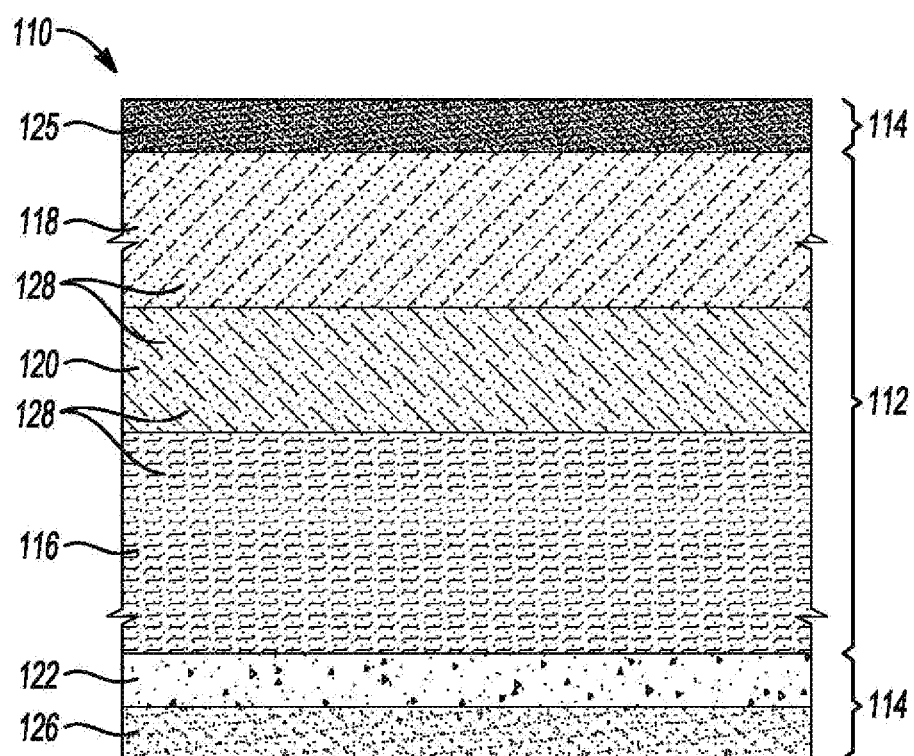

Referring to FIG. 2, a metal-air battery cell 110 includes an electrode assembly 112 and a pouch 114. The electrode assembly 112 includes an air electrode 116, a negative electrode 118, and a separator 120 in contact with and between the air electrode 116 and negative electrode 118.

The pouch 114 includes a gas permeable hydrophobic flexible layer 122 in contact with the side of the air electrode 116 opposite the separator 120, and a gas reduction layer 125 in contact with the negative electrode 118 such that the gas permeable hydrophobic flexible layer 122 is not in contact with the negative electrode 118, and the gas reduction layer 125 is not in contact with the air electrode 116. The pouch 114 further includes a gas reduction layer 126 in contact with the side of the gas permeable hydrophobic flexible layer 122 opposite the air electrode 116. The gas reduction layers 125, 126 may be distinct components or portions of one continuous component.

The gas permeable hydrophobic flexible layer 122 (or the gas reduction layer 126) and the gas reduction layer 125 are sealed to each other around a perimeter of the pouch 114. A thermoplastic hot melt or other adhesive can further define a seam for the pouch 114. As a result, the pouch 114 envelops the electrode assembly 112 and contains an electrolyte 128 within which the electrode assembly 112 is immersed, in contact with, or wetted.

Other contemplated pouch configurations include a gas reduction layer or layers in contact with and enveloping two gas permeable hydrophobic flexible layers, which are in contact with sides of two air electrodes opposite the separators. The separators are also in contact with one negative electrode. The gas reduction layer or layers may be distinct components or portions of one continuous component.

Figure 3:
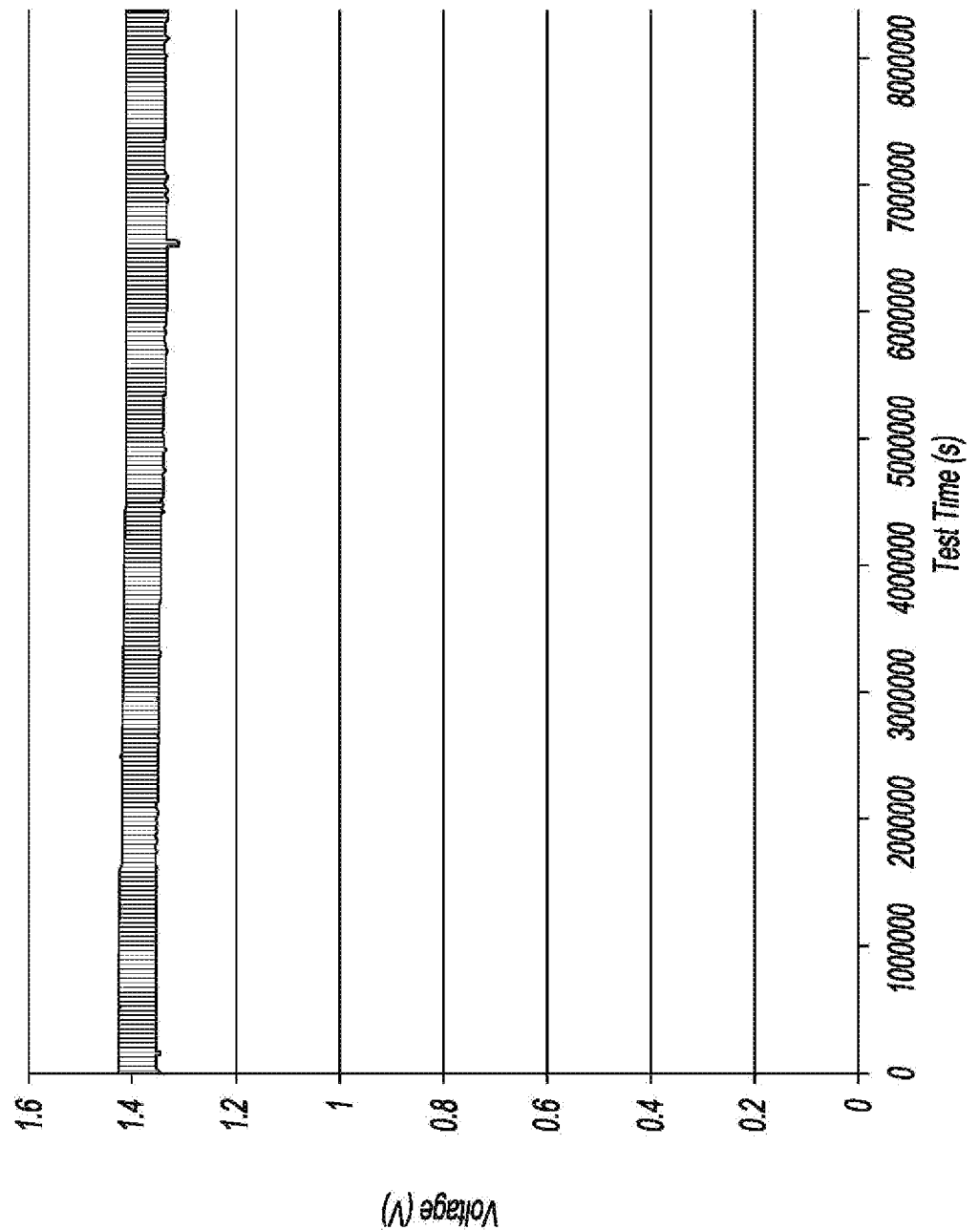
FIG. 3 is a plot of discharge voltage versus time for a metal-air pouch cell with a gas reduction layer.
Figure 4:
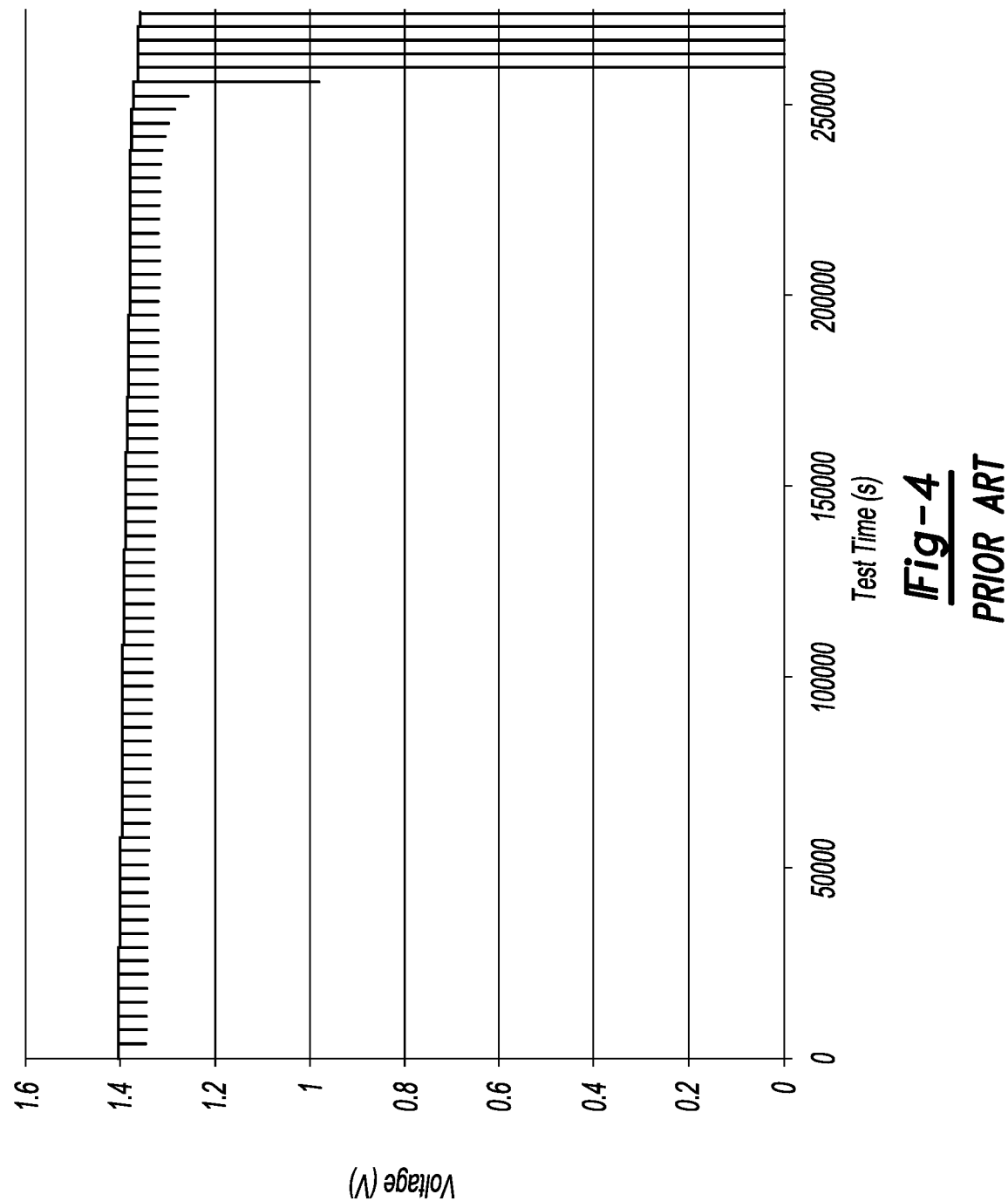
FIG. 4 is a plot of discharge voltage versus time for a metal-air pouch cell without a gas reduction layer.

Referring to FIGS. 3 and 4, the performance of metal-air pouch cells, of the types contemplated herein, with and without gas reduction layers is noticeably different when tested with a pulse discharge followed by standby current. FIG. 3 shows that the discharge voltage of a metal-air pouch cell with a gas reduction layer remains relatively consistent well past 2,000 hours of operation. FIG. 4 shows that the discharge voltage of a metal-air pouch cell without a gas reduction layer significantly degrades after a mere 70 hours.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A metal air battery cell comprising:
    an electrode assembly including an air electrode;
    a negative electrode;
    a separator in contact with and disposed between the electrodes;
    a sealed pouch that envelops the electrode assembly and contains an electrolyte therein, wherein the pouch is defined by a gas permeable hydrophobic flexible layer in contact with the air electrode, and a gas and liquid impermeable flexible layer in contact with the negative electrode; and
    a metallocene film in contact with and completely covering the gas permeable hydrophobic flexible layer such that the gas permeable hydrophobic flexible layer is between the metallocene film and air electrode.

2. The metal air battery cell of claim 1, wherein the metallocene film is in contact with or adhered with the gas permeable hydrophobic flexible layer.

3. The metal air battery cell of claim 1 further comprising a terminal extending from and away at least one of the electrodes, and through the pouch, wherein the gas permeable hydrophobic flexible layer and gas and liquid impermeable flexible layer are each in contact with the terminal and sealed to each other and around the terminal.

4. The metal air battery cell of claim 1, wherein the negative electrode includes zinc.

5. The metal air battery cell of claim 1, wherein the hydrophobic gas diffusion layer includes a non-sintered polytetrafluoroethylene film.

6. The metal air battery cell of claim 1, wherein the hydrophobic gas diffusion layer includes a carbon network.

\* \* \* \* \*